(12) United States Patent
Inomata (10) Patent No.: US 9,643,576 B2
(45) Date of Patent: May 9, 2017

(54) COLLISION AVOIDANCE ASSIST DEVICE AND COLLISION AVOIDANCE ASSIST METHOD

(71) Applicant: TOYOTA JIDOSHA KABUSHIKI KAISHA, Toyota-shi, Aichi (JP)

(72) Inventor: Ryo Inomata, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/435,274

(22) PCT Filed: Oct. 30, 2012

(86) PCT No.: PCT/JP2012/078025
§ 371 (c)(1),
(2) Date: Apr. 13, 2015

(87) PCT Pub. No.: WO2014/068669
PCT Pub. Date: May 8, 2014

(65) Prior Publication Data
US 2015/0266456 A1    Sep. 24, 2015

(51) Int. Cl.
| B60T 7/22 | (2006.01) |
| G08G 1/16 | (2006.01) |
| G01S 13/04 | (2006.01) |
| G01S 13/93 | (2006.01) |

(52) U.S. Cl.
CPC ............ *B60T 7/22* (2013.01); *G01S 13/04* (2013.01); *G01S 13/931* (2013.01); *G08G 1/165* (2013.01); *G08G 1/166* (2013.01); *B60T 2201/022* (2013.01); *G01S 2013/9346* (2013.01)

(58) Field of Classification Search
CPC ... B60T 8/172; B60T 7/22; B60T 7/12; B60T 2201/022; G01S 13/04; G01S 13/931; G01S 2013/9346; G08G 1/166; G08G 1/165
USPC ......................................................... 701/70
See application file for complete search history.

(56) References Cited

U.S. PATENT DOCUMENTS

| 6,259,992 B1 | 7/2001 | Urai et al. |
| 2003/0106732 A1 | 6/2003 | Watanabe et al. |
| 2008/0215232 A1* | 9/2008 | Ikeda ................. G08G 1/09675 701/117 |
| 2009/0018740 A1* | 1/2009 | Noda ........................ B60T 7/22 701/70 |
| 2009/0210114 A1 | 8/2009 | Baumann et al. |

(Continued)

FOREIGN PATENT DOCUMENTS

| CN | 101500865 A | 8/2009 |
| JP | 2000057496 A | 2/2000 |

(Continued)

*Primary Examiner* — Behrang Badii
*Assistant Examiner* — Daniel L Greene
(74) *Attorney, Agent, or Firm* — Sughrue Mion, PLLC (57) ABSTRACT

A collision avoidance assist device that performs an assist for avoiding a collision between a vehicle and an object includes an object detection unit that detects the object around the vehicle, a time calculation unit that calculates a time to collision between the vehicle and the object based on the detection result of the object detection unit, and an assist control unit that suppresses a release of a braking for avoidance assist as the time to collision decreases when an execution of the collision avoidance assist is controlled based on the time to collision.

5 Claims, 6 Drawing Sheets

(56) References Cited

U.S. PATENT DOCUMENTS

| | | |
|---|---|---|
| 2009/0326820 A1 | 12/2009 | Shimizu |
| 2012/0019375 A1* | 1/2012 | Kataoka ................ B60W 50/14 340/439 |
| 2012/0226423 A1 | 9/2012 | Sekiguchi |

FOREIGN PATENT DOCUMENTS

| | | |
|---|---|---|
| JP | 2009051241 A | 3/2009 |
| JP | 2009101756 A | 5/2009 |
| JP | 2011110958 A | 6/2011 |
| JP | 2012-183867 A | 9/2012 |
| KR | 2003-0047835 A | 6/2003 |

* cited by examiner

COLLISION AVOIDANCE ASSIST DEVICE
AND COLLISION AVOIDANCE ASSIST
METHOD

CROSS REFERENCE TO RELATED
APPLICATIONS

This application is a National Stage of International Application No. PCT/JP2012/078025 filed Oct. 30, 2012, the contents of all of which are incorporated herein by reference in their entirety.

TECHNICAL FIELD

The present invention relates to a collision avoidance assist device and a collision avoidance assist method that performs an assist for avoiding a collision between a vehicle and an object.

BACKGROUND ART

In the related art, as disclosed in Japanese Unexamined Patent Application Publication No. 2000-57496, as a collision avoidance assist device and a collision avoidance assist method, a device and a method are known, in which a degree of possibility of contact with an object is obtained according to the detection situation up to the time of losing sight of the object during the automatic braking, and it is determined whether or not to continue an automatic braking based on the obtained degree of possibility of the contact.

CITATION LIST

Patent Literature

[Patent Literature 1] Japanese Unexamined Patent Application Publication No. 2000-57496

SUMMARY OF INVENTION

Technical Problem

Incidentally, in a collision avoidance assist device, there is a case where the accuracy of detecting an object easily deteriorates due to deceleration caused by a braking for the avoidance assist. In this case, a possibility of collision with the object is determined based on the low-accuracy detection result, and then, it is determined whether or not to release the braking for avoidance assist based on such a determination, and thus, there is a possibility that the braking for avoidance assist is released in an unnatural state for a driver.

Therefore, the present invention is to provide a collision avoidance assist device and a collision avoidance assist method in which it is possible to suppress the release of the braking for avoidance assist in the unnatural state for the driver due to the deterioration in the accuracy of detecting the object.

Solution to Problem

A collision avoidance assist device according to the invention is a collision avoidance assist device configured to perform an assist for avoiding a collision between a vehicle and an object, and includes: an object detection unit configured to detect the object around the vehicle; a time calculation unit configured to calculate a time to collision between the vehicle and the object based on the detection result of the object detection unit; and an assist control unit configured to suppress a release of a braking for avoidance assist as the time to collision decreases when an execution of the collision avoidance assist is controlled based on the time to collision.

In this way, the release of the braking for avoidance assist is suppressed as the time to collision decreases when the collision avoidance assist is executed. Here, the accuracy of detecting the object easily deteriorates as the collision with the object becomes imminent and the time to collision decreases during the braking for avoidance assist. Therefore, since the release of the braking for avoidance assist is suppressed as the time to collision decreases and the accuracy of detecting the object easily deteriorates, it is possible to suppress the release of the braking for avoidance assist in the unnatural state for the driver due to the deterioration in the accuracy of detecting the object.

In addition, the assist control unit may suppress the release of the braking for avoidance assist further after a predetermined time has passed from the starting of the braking for avoidance assist than before the predetermined time has passed.

In addition, the assist control unit may suppress the release of the braking for avoidance assist further after a duration of the braking for avoidance assist exceeds a threshold value than before the duration of the braking for avoidance assist exceeds the threshold value.

In addition, the assist control unit may suppress the release of the braking for avoidance assist by at least one of the processes of making it easier to determine the object to be a target of the braking for avoidance assist, suppressing a decrease in the braking amount due to the braking for avoidance assist, or alleviating a release condition of the braking for avoidance assist.

In addition, the assist control unit may suppress the release of the braking for avoidance assist by making it easier to determine a possibility of the collision between the vehicle and the object to be high.

In addition, the assist control unit may suppress the release of the braking for avoidance assist by expanding a regulation range of a horizontal position of the collision that is used for determining the possibility of the collision.

In addition, the assist control unit may prohibit the release of the braking for avoidance assist.

A collision avoidance assist method according to the invention is a collision avoidance assist method in which an assist for avoiding a collision between a vehicle and an object is executed, and includes: detecting the object around the vehicle; calculating a time to collision between the vehicle and the object based on the detection result; and suppressing a release of a braking for avoidance assist as the time to collision decreases when an execution of the collision avoidance assist is controlled based on the time to collision.

In this way, the release of a braking for avoidance assist is suppressed as the time to collision decreases when the collision avoidance assist is executed. Here, the accuracy of detecting the object easily deteriorates as the collision with the object becomes imminent and the time to collision decreases during the braking for avoidance assist. Therefore, since the release of the braking for avoidance assist is suppressed as the time to collision decreases and the accuracy of detecting the object easily deteriorates, it is possible to suppress the release of the braking for avoidance assist in the unnatural state for the driver due to the deterioration in the accuracy of detecting the object.

Advantageous Effects of Invention

According to the present invention, it is possible to provide a collision avoidance assist device and a collision avoidance assist method that can suppress the release of the braking for avoidance assist in an unnatural state for a driver due to the deterioration in the accuracy of detecting an object.

DESCRIPTION OF EMBODIMENTS

Hereinafter, a collision avoidance assist device and a collision avoidance assist method in the embodiment of the present invention will be described in detail with reference to the drawings attached hereto. The same reference numerals will be given to the same elements, and the descriptions thereof will not be repeated. The collision avoidance assist device is a device that is mounted on a vehicle for performing a collision avoidance assist between a vehicle and an object.

Figure 1:
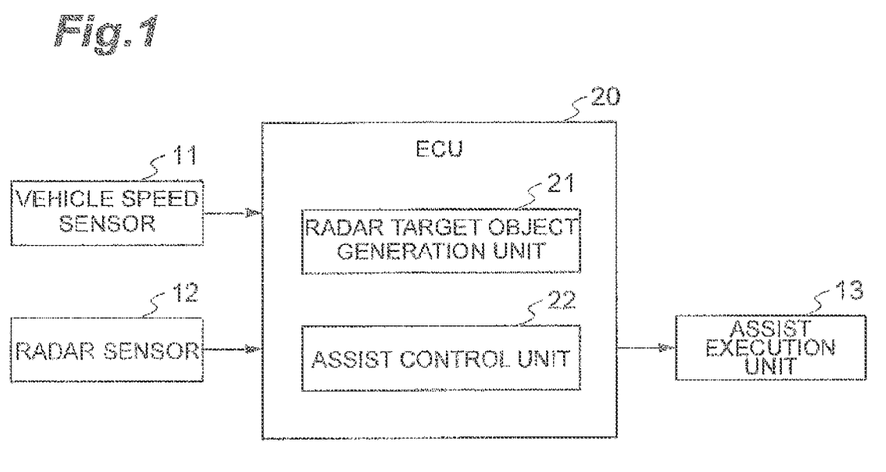
FIG. 1 is a block diagram illustrating a collision avoidance assist device in the embodiment of the present invention.

First, a configuration of the collision avoidance assist device in the embodiment of the present invention will be described with reference to FIG. 1. FIG. 1 is a block diagram illustrating the collision avoidance assist device in the embodiment of the present invention.

As illustrated in FIG. 1, the collision avoidance assist device includes a vehicle speed sensor 11, a radar sensor 12, an assist execution unit 13 and an electronic control unit (ECU) 20.

The vehicle speed sensor 11 detects a speed of the vehicle (vehicle speed). As the vehicle speed sensor 11, for example, a wheel speed sensor provided on the wheel is used. The vehicle speed sensor 11 supplies the detection result of the vehicle speed to the ECU 20.

The radar sensor 12 functions as an object detection unit that detects an object around the vehicle. As the radar sensor 12, for example, a millimeter wave radar, a laser radar, or the like is used. The radar sensor 12 is, for example, provided on the front surface of the vehicle body, transmits an electromagnetic wave, and detects the object based on the reception result of the electromagnetic wave reflected from the object. The radar sensor 12 supplies the detection result of a position of the object and a relative speed of the object to the ECU 20. The radar sensor 12 may be configured so as to detect the object by combining each of the detection results of a long distance radar and a short distance radar.

The assist execution unit 13 executes the assist for avoiding the collision between the vehicle and the object based on a time to collision (TTC) described below. The assist execution unit 13 executes at least one of a notification assist and a control assist while being controlled by the ECU 20.

In the notification assist, for example, a notice of information for an attention to the collision, guidance to the collision avoidance operations, or the like is given to a driver using a display, a speaker, or a vibrator. In the control assist, for example, a control intervention for a braking for avoidance assist, steering for avoidance assist, a collision safety assist, or the like is performed using a brake actuator, a steering actuator, or a seat belt actuator. In the steering for avoidance assist, for example, an automatic steering for avoidance assist, an auxiliary assist for steering by the driver, a continuous assist for steering using physical stimulation, or the like is performed. In the braking for avoidance assist, for example, an automatic braking assist, an auxiliary assist for braking operation by the driver, a continuous assist for the braking operation using physical stimulation, or the like is performed.

The ECU 20 includes a radar target object generation unit 21 and an assist control unit 22. The ECU 20 is configured to mainly include a CPU, ROM, and RAM, and realizes the functions of the radar target object generation unit 21 and the assist control unit 22 through the execution of a program by the CPU. The functions of the radar target object generation unit 21 and the assist control unit 22 may be realized by two or more ECUs 20.

The radar target object generation unit 21 generates a radar target object based on the detection result by the radar sensor 12. The radar target object has information about vertical and horizontal distances to the object and a relative speed of the object. The vertical distance to the object is the distance to the object in a traveling direction of the vehicle, and the horizontal distance to the object is the distance in a direction orthogonal to the traveling direction of the vehicle. The relative speed of the object is a relative speed between the vehicle and the object.

The assist control unit 22 controls the execution of assist for avoiding the collision between the vehicle and the object using the radar target object. The assist control unit 22 functions as a time calculation unit that calculates the time to collision between the vehicle and the object based on the detection result of the radar sensor 12. The assist control unit 22 obtains the time to collision with the object and the possibility of the collision using the radar target object, and supplies the control signal according to the time to collision and the possibility of the collision to the assist execution unit 13. The assist control unit 22 controls the execution of at least one of the notification assist and the control assist according to the time to collision and the possibility of the collision, and in the control assist, controls the execution of at least one of the steering for avoidance assist and the braking for avoidance assist. In the braking for avoidance assist, the assist control unit 22 supplies the control signal for controlling the start and end (release) of the braking for avoidance assist and an amount of braking to the assist execution unit 13.

The time to collision is a time margin to the predicted collision and is obtained by dividing the distance to the object by the relative speed. The possibility of the collision is obtained based on indices such as the horizontal position of the object, a horizontal position of the collision, an existence probability, or a probability of host vehicle lane.

The horizontal position of the object is the present position of the object in the direction orthogonal to the traveling direction of the vehicle, the horizontal position of the collision is the horizontal position of the object at the predicted collision time point, and it is predicted based on the movement trajectory of the radar target object. The existence probability is the probability of the existence of the object corresponding to the radar target object, and it is obtained based on the generation state of the radar target object. The probability of host vehicle lane is the probability that the object corresponding to the radar target object is present on the driving lane of the vehicle, and it is obtained based on the generation state and the position of the radar target object.

Here, the assist control unit 22, when controlling the execution of the collision avoidance assist, suppresses the release of the braking for avoidance assist as the time to collision decreases. The release of the braking for avoidance assist means the ending of the braking for avoidance assist. In addition, the braking for avoidance assist may be prohibited instead of being released.

In addition, the assist control unit 22 may suppress the release of the braking for avoidance assist further after a predetermined time has passed from the starting of the braking for avoidance assist than before the predetermined time has passed. This is because the braking for avoidance assist is more easily released in an unnatural state for the driver due to the deterioration in the accuracy of detection when the time to collision becomes shorter than, for example, one second after the predetermined time has passed from the starting of the braking for avoidance assist than before the predetermined time has passed.

Figure 2:
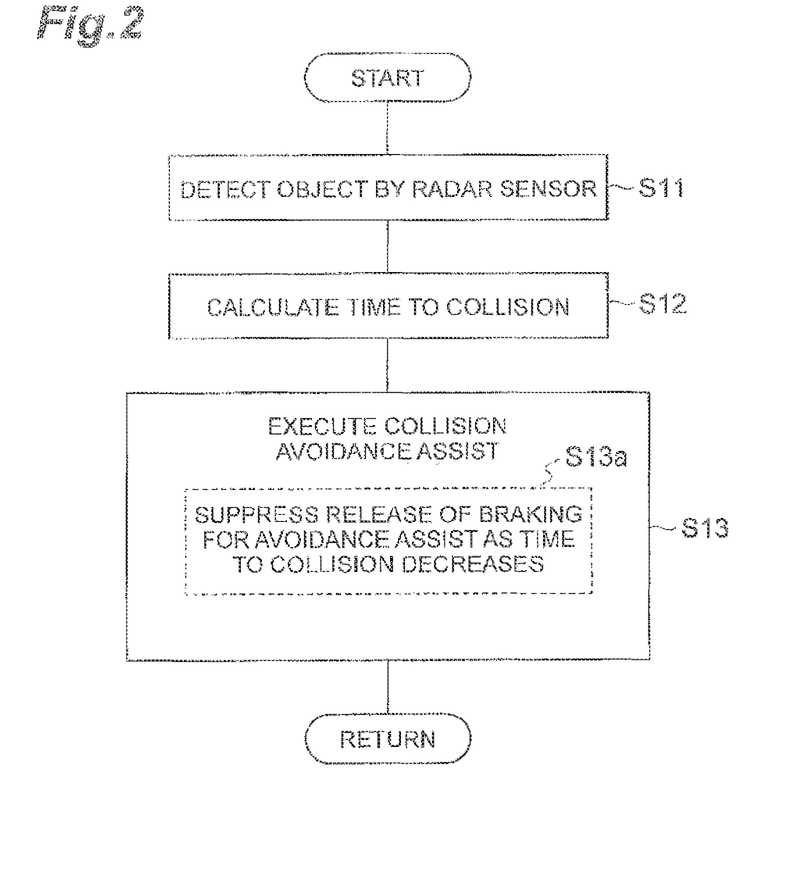
FIG. 2 is a flowchart illustrating a collision avoidance assist method in the embodiment of the present invention.

Next, a collision avoidance assist method and an operation of the collision avoidance assist device in the embodiment of the present invention will be described with reference to FIG. 2 to FIG. 6. FIG. 2 is a flowchart illustrating the collision avoidance assist method in the embodiment of the present invention.

As illustrated in FIG. 2, the radar sensor 12 detects the object around the vehicle (S11). The assist control unit 22 calculates the time to collision between the vehicle and the object based on the detection result of the radar sensor 12 (S12). The assist execution unit 13 executes the assist for avoiding the collision between the vehicle and the object based on the time to collision (S13). Here, when executing the collision avoidance assist, the assist control unit 22 suppresses the release of the braking for avoidance assist as the time to collision decreases (S13a).

The release of the braking for avoidance assist may be suppressed by at least one of the following: making it easier to determine the object to be a target of the braking for avoidance assist; suppressing the decrease in the braking amount due to the braking for avoidance assist; or alleviating the release condition of the braking for avoidance assist. Particularly, the release of the braking for avoidance assist may be suppressed by making it easier to determine the possibility of the collision between the vehicle and the object to be high.

Figure 3:
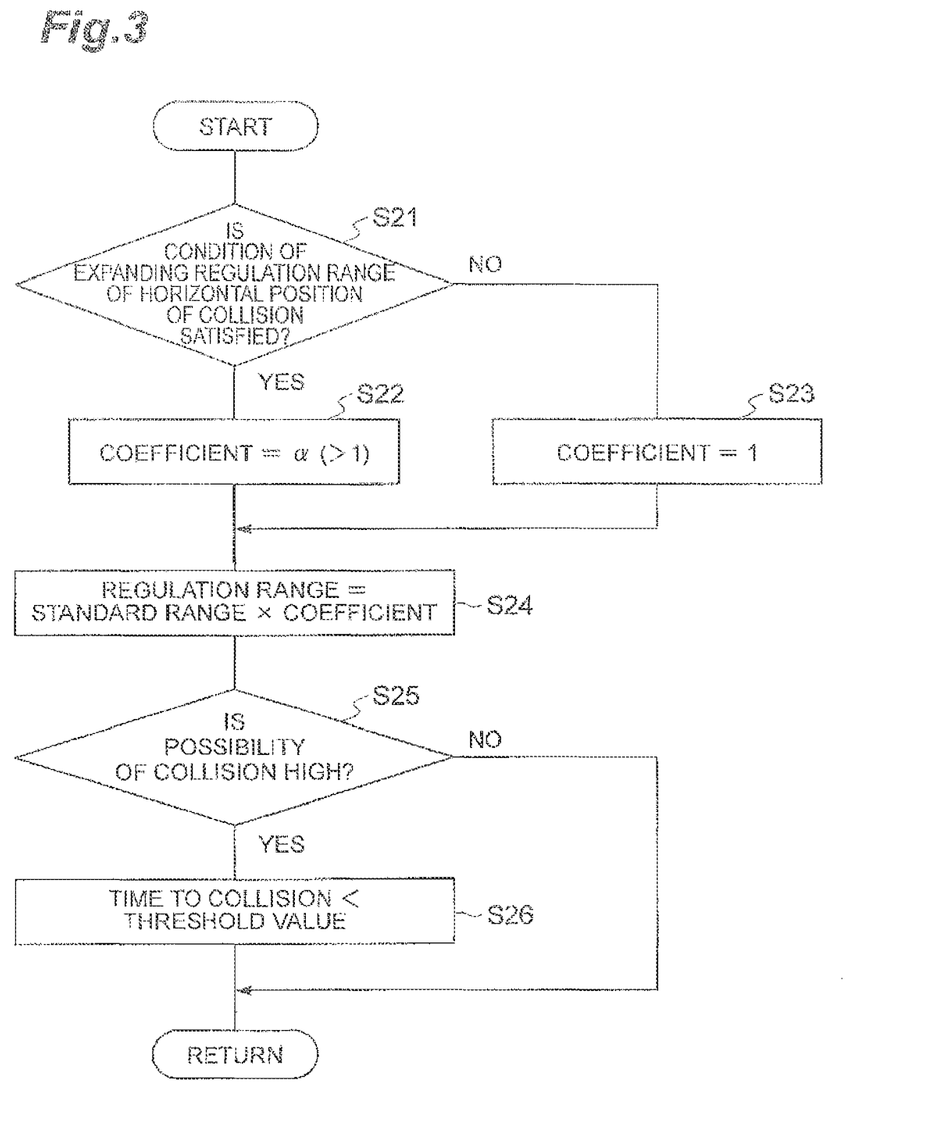
FIG. 3 is a flowchart illustrating the details of the collision avoidance assist method in the embodiment of the present invention.

FIG. 3 is a flowchart illustrating the details of the collision avoidance assist method in the embodiment of the present invention. The collision avoidance assist device executes the processing illustrated in FIG. 3 in a manner of repeating for each processing cycle.

FIG. 3 illustrates a case of suppressing the release of the braking for avoidance assist by expanding a regulation range of the horizontal position of the collision that is used in determining the possibility of the collision. The method of suppressing the release of the braking for avoidance assist is not limited to the method described above.

Here, the horizontal position of the collision is, as described above, the horizontal position of the object at the predicted collision time point, and it is predicted based on the movement trajectory of the radar target object. The regulation range of the horizontal position of the collision is a threshold value used for determining the possibility of the collision, and in a case where the horizontal position of the collision is not in the regulation range, it is determined that the horizontal position of the collision does not satisfy the threshold value. Then, in addition to the horizontal position of the collision of the object, in a case where each index of the horizontal position, the existence probability, and the probability of host vehicle lane satisfies the respective threshold value, it is determined that the possibility of the collision is high, and any one of the indices does not satisfy the threshold value, it is not determined that the possibility of the collision is high.

As illustrated in FIG. 3, the assist control unit 22 determines whether or not the condition of expanding the regulation range of the horizontal position of the collision is satisfied (S21). The condition of expanding the regulation range is satisfied in a case where a count of continuous assist exceeds the threshold value. The count of continued assist indicates the number of processing cycles continuing the braking for avoidance assist with the same object as the target. The target object which becomes the target of the braking for avoidance assist is selected as a target object which has a highest possibility of collision and has the shortest time to collision among the simultaneously existing target objects. That is, the fact that the count of continued assist exceeds the threshold value means that the collision with the object is imminent and the time to collision decreases.

Then, the assist control unit 22 sets a coefficient as a ($>1$) (S22) in a case where it is determined that the condition of expanding is satisfied, and sets the coefficient as 1 (S23) in a case where it is not determined that the condition of expanding is satisfied. The assist control unit 22 sets the regulation range by multiplying the standard range set to approximately same to a width of the vehicle by the set coefficient (S24). Here, in a case where condition of expanding the regulation range is satisfied, the regulation range can be expanded by multiplying the standard range by the coefficient $\alpha$.

When the regulation range is set, the assist control unit 22 determines whether or not the possibility of the collision is high based on the set regulation range (S25). In a case where it is determined that the possibility of the collision is high, the assist control unit 22 determines whether or not the time to collision is shorter than the threshold value (S26). Then, in a case where the time to collision is shorter than the threshold value, the assist control unit 22 continues the braking for avoidance assist.

On the other hand, in S25, in a case where it is not determined that the possibility of the collision is high, the assist control unit 22 ends the processing of that processing cycle without determining the time to collision in S26. Therefore, in a case where it is not determined that the possibility of the collision is high in S25, it is not determined that the braking for avoidance assist is to be continued, and the braking for avoidance assist is released.

For this reason, according to the collision avoidance assist method described above, it is determined whether or not the time to collision decreases by determining whether or not the count of continued assist exceeds the threshold value, and in a case where the time to collision decreases, the release of the braking for avoidance assist is suppressed by the regulation range of the horizontal position of the collision being expanded.

Figure 4A:
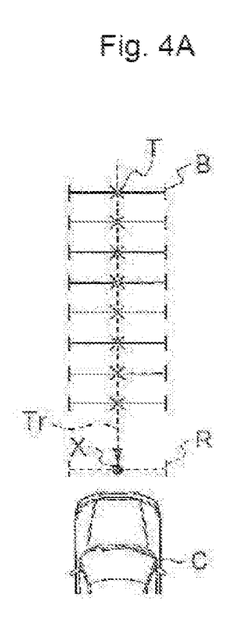
In FIGS. 4(a), 4(b) and 4(c), there are diagrams illustrating positional relationships between a vehicle and an object during a collision avoidance assist in a time series manner.
Figure 4B:
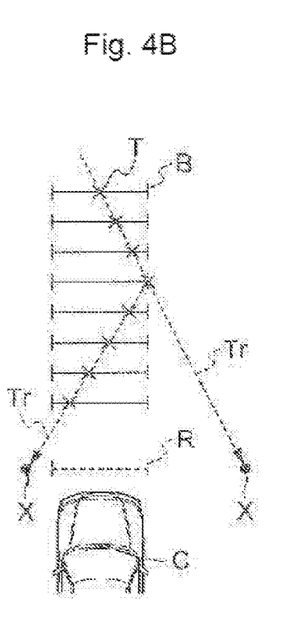
Figure 4C:
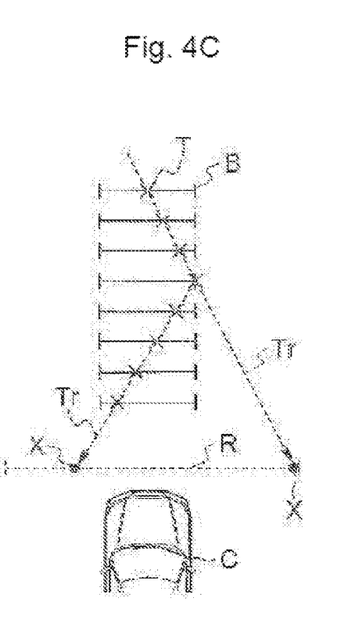

In FIG. 4, there are diagrams illustrating positional relationships of a vehicle C and an object during the braking for avoidance assist in a time series manner. In FIG. 4, a regulation range R of the horizontal position X of the collision is illustrated together with the horizontal position X of the collision that is estimated from a width B of the object, a detected position T of the object (a position T of the radar target object), and a trajectory Tr of the detected position T. The regulation range R of the horizontal position X of the collision is set to the standard range in the example illustrated in FIG. 4(a) and FIG. 4(b), and is expanded from the standard range in the example illustrated in FIG. 4(c).

In the example in FIG. 4(a), the detected position T of the object does not change in the width B direction of the object and the horizontal position X of the collision is predicted to be in the regulation range R from the trajectory Tr of the detected position T. Therefore, it is appropriately determined that the possibility of the collision is high.

On the other hand, in the example illustrated in FIG. 4(b), since a reflection point of the electromagnetic wave changes according to the shape of the object, the detected position T of the object changes in the width B direction. Then, since the horizontal position X of the collision is predicted to out of the regulation range R from the trajectory Tr of the detected position T, even though the possibility of the collision is high, it is erroneously determined that the possibility of the collision is low.

In contrast, in the example illustrated in FIG. 4(c), though the detected position T of the object changes in the width B direction, regulation range R of the horizontal position X of the collision is expanded. Then, since the horizontal position X of the collision is predicted to be in the regulation range R from the trajectory Tr of the detected position T, it is appropriately determined that the possibility of the collision is high.

Figure 5:
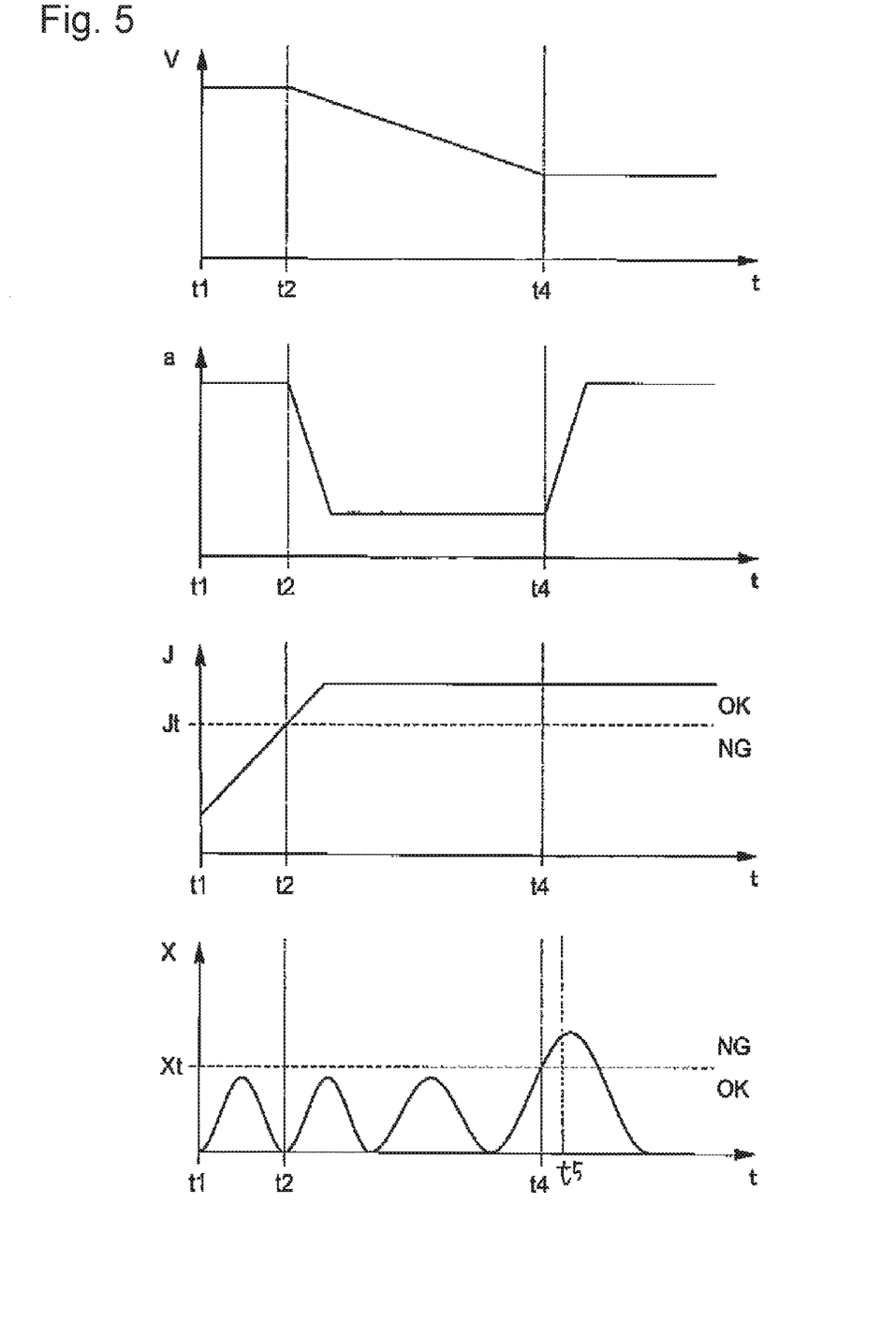
In FIG. 5, there are diagrams comparatively illustrating the situations of a braking for avoidance assist in FIG. 4(b) in a time series manner.
Figure 6:
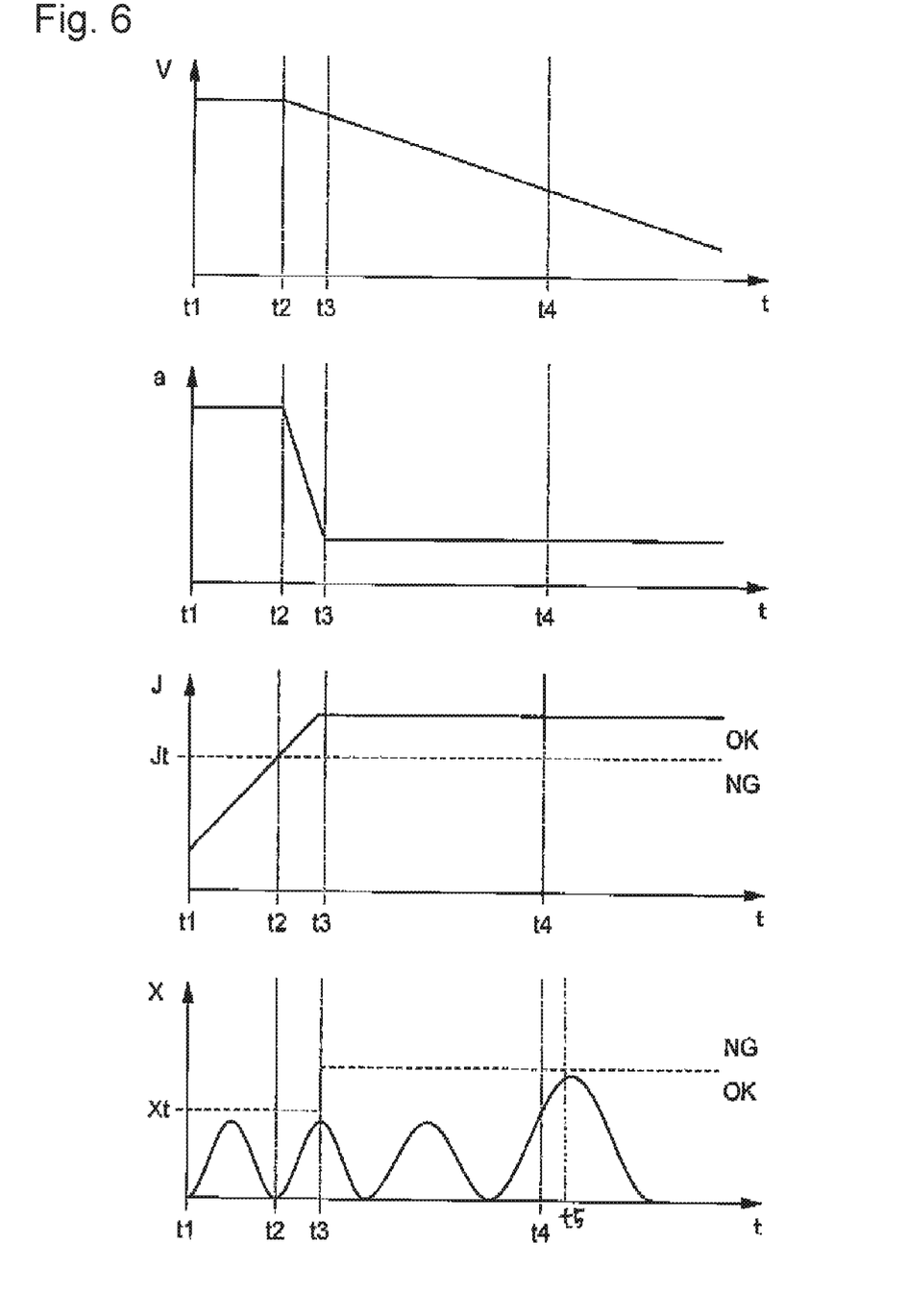
In FIG. 6, there are diagrams comparatively illustrating the situations of a braking for avoidance assist in FIG. 4(c) in a time series manner.

In FIG. 5, there are diagrams illustrating the situations of a braking for avoidance assist in FIG. 4(b) in a time series manner. In FIG. 6, there are diagrams illustrating the situations of a braking for avoidance assist in FIG. 4(c) in a time series manner. In FIG. 5 and FIG. 6, a vehicle speed V, an acceleration a, the horizontal position X of the collision, and an index J (another index) indicating the possibility of the collision other than the horizontal position X of the collision are illustrated.

In the situation illustrated in FIG. 5, during a period of t1 to t2, a vehicle travels at a substantially constant speed is approaching the object. Another index J indicating the possibility of the collision is approaching a threshold value Jt while the time to collision decreases. The horizontal position X of the collision changes within the regulation range (less than the threshold value Xt) while the detected position of the object changes in the width direction. At the point in time t2, by the fact that another index J satisfies the threshold value Jt (equal to greater than the threshold value Jt) and the horizontal position X of the collision satisfies the threshold value Xt (less than the threshold value Xt), the deceleration by the braking for avoidance assist starts.

During a period of t2 to t4, since the deceleration continues due to the braking for avoidance assist, the vehicle speed V gradually decreases. Another index J satisfies the threshold value Jt by the fact that the time to collision decreases. The horizontal position of the collision changes within the regulation range by the fact that the horizontal position X of the collision changes in the width direction.

At a point in time t4, the horizontal position X of the collision departs from the regulation range by the fact that the accuracy of detecting the object deteriorates. Then, it is erroneously determined that the possibility of the collision is low, the braking for avoidance assist is released and the deceleration ends, and thus, the decrease in the vehicle speed V ends.

On the other hand, in the situation illustrated in FIG. 6, at the point in time t3 when the deceleration is continued over a certain time after the deceleration by the braking for avoidance assist starts at the point in time t2, the regulation range of the horizontal position X of the collision is expanded. For this reason, even if the accuracy of detecting the object deteriorates at the point in time t4, the horizontal position X of the collision does not depart from the regulation range. Therefore, it is not erroneously determined that the possibility of the collision is low, the braking for avoidance assist is not released and the deceleration is continued, and thus, the decrease in the vehicle speed V is maintained.

As described above, according to the collision avoidance assist device and collision avoidance assist method in the embodiment of the present invention, during the braking for avoidance assist, as the time to collision decreases and the accuracy of detecting an object easily deteriorates, the release of the braking for avoidance assist is suppressed. Therefore, it is possible to suppress the release of the braking for avoidance assist in an unnatural state for the driver due to the deterioration in the accuracy of detecting the object. In a case where the time to collision is long, since the accuracy of the detecting the object hardly deteriorates, the release of the braking for avoidance assist may not be suppressed.

In addition, the assist control unit 22 may suppress the release of the braking for avoidance assist further after the predetermined time has passed from the starting of the braking for avoidance assist than before the predetermined time has passed.

The assist control unit 22 may suppress the release of the braking for avoidance assist further after the duration of the braking for avoidance assist exceeds the threshold value than before the duration exceeds the threshold value.

In addition, the assist control unit 22 may suppress the release of the braking for avoidance assist by at least one of the following: making it easier to determine the object to be a target of the braking for avoidance assist; suppressing the decrease in the braking amount due to the braking for avoidance assist; or alleviating the release condition of the braking for avoidance assist.

In addition, the assist control unit 22 may suppress the release of the braking for avoidance assist by making it easier to determine the possibility of the collision between the vehicle and the object to be high.

In addition, the assist execution unit 22 may suppress the release of the braking for avoidance assist by expanding the regulation range of the horizontal position of the collision that is used for determining the possibility of the collision.

In addition, the assist control unit 22 may prohibit the release of the braking for avoidance assist.

The embodiment described above is the best mode for the embodiment of the collision avoidance assist device and collision avoidance assist method in the present invention, and the collision avoidance assist device and collision avoidance assist method in the present invention are not limited to the embodiment described above. The collision avoidance assist device and collision avoidance assist method in the present invention may be modified from the collision avoidance assist device and collision avoidance assist method in the present embodiment without departing from the scope of the invention described in the Claims attached hereto, or may be applied to other devices or methods.

REFERENCE SIGNS LIST 11 vehicle speed sensor, 12 radar sensor, 13 assist execution unit, 20 ECU, 21 radar target object generation unit, 22 assist control unit

The invention claimed is:

1. A collision avoidance assist device configured to perform an assist for avoiding a collision between a vehicle and an object, the device comprising:
    an object detection unit that detects the object around the vehicle;
    a time calculation unit that calculates a time to collision between the vehicle and the object based on a detection result of the object detection unit; and
    an assist control unit that controls braking for avoidance assist and suppresses a release of the braking for avoidance assist in a case where the time to collision continuously decreases when an execution of the collision avoidance assist is controlled based on the time to collision, and suppresses the release of the braking for avoidance assist further after a predetermined time has passed from starting of the braking for avoidance assist than before the predetermined time has passed;
    wherein the assist control unit suppresses the release of the braking for avoidance assist by expanding a regulation range of a horizontal position of the collision that is used for determining a possibility of collision.

2. The collision avoidance assist device according to claim 1,
    wherein the assist control unit suppresses the release of the braking for avoidance assist further after a duration of the braking for avoidance assist exceeds a threshold value than before the duration of the braking for avoidance assist exceeds the threshold value.

3. The collision avoidance assist device according to claim 1,
    wherein the assist control unit prohibits the release of the braking for avoidance assist.

4. A collision avoidance assist method in which an assist for avoiding a collision between a vehicle and an object is executed, the method comprising:
    detecting the object around the vehicle;
    calculating a time to collision between the vehicle and the object based on the detection result;
    controlling braking for avoidance assist and suppressing a release of the braking for avoidance assist in a case where the time to collision continuously decreases when an execution of the collision avoidance assist is controlled based on the time to collision, wherein suppressing a release of the braking for avoidance assist comprises expanding a regulation range of a horizontal position of the collision that is used for determining a possibility of collision, and
    suppressing the release of the braking for avoidance assist further after a predetermined time has passed from starting of the braking for avoidance assist than before the predetermined time has passed.

5. A collision avoidance assist device configured to perform an assist for avoiding a collision between a vehicle and an object, the device comprising:
    a radar sensor that detects the object around the vehicle;
    an engine control processor that calculates a time to collision between the vehicle and the object based on a detection result of the object detection unit; and
    wherein the engine control processor also controls braking for avoidance assist, and suppresses a release of the braking for avoidance assist;
    wherein the engine control processor suppresses the release of the braking for avoidance assist by expanding a regulation range of a horizontal position of the collision that is used for determining a possibility of collision.

* * * * *